United States Patent

Twigg et al.

Patent Number: 5,515,615
Date of Patent: May 14, 1996

[54] METHODS OF AND DEVICE FOR MEASURING THE CURVATURE OF AN OBJECT

[75] Inventors: Michael J. Twigg, Millington; Montell Barbee, Somerville, both of Tenn.

[73] Assignee: Emhart Inc., Newark, Del.

[21] Appl. No.: 361,613

[22] Filed: Dec. 22, 1994

[51] Int. Cl.⁶ .................................................. G01B 5/20
[52] U.S. Cl. .............................. 33/551; 33/1 M; 33/508; 33/549; 33/559
[58] Field of Search ...................... 33/1 C, 1 M, 1 MP, 33/1 PT, 289, 503, 508, 505, 549, 551, 552, 553, 554, 556, 557, 559, 560, 561, 573, 589, 734, 735, 772, 773; 273/80 B

[56] References Cited

U.S. PATENT DOCUMENTS

| | | | |
|---|---|---|---|
| 2,126,717 | 8/1938 | Barnhart | 273/80 B |
| 3,991,745 | 11/1976 | Yoslow et al. | 33/512 |
| 4,070,022 | 1/1978 | Braly | 273/80 B |
| 4,132,003 | 1/1979 | Schrewe et al. | 33/560 |
| 4,164,694 | 8/1979 | Amsbury et al. | 33/551 |
| 4,169,595 | 10/1979 | Kaugars | 273/77 A |
| 4,356,556 | 10/1982 | Sterki | 33/1 M |
| 4,558,863 | 12/1985 | Haas et al. | 273/80 B |
| 4,685,682 | 8/1987 | Isabell | 273/80 B |
| 5,163,681 | 11/1992 | Hodgetts | 273/77 A |
| 5,207,005 | 5/1993 | Amos et al. | 33/551 |
| 5,301,436 | 4/1994 | Johnston | 33/551 |
| 5,353,510 | 10/1994 | Ulbrich | 33/504 |

FOREIGN PATENT DOCUMENTS

| | | | |
|---|---|---|---|
| 273593 | 7/1988 | European Pat. Off. | 33/551 |
| 52-2626 | 1/1977 | Japan | 33/508 |
| 58-55801 | 4/1983 | Japan | 33/773 |
| 60-249554 | 12/1985 | Japan | 33/551 |

Primary Examiner—William A. Cuchlinski, Jr.
Assistant Examiner—G. Bradley Bennett
Attorney, Agent, or Firm—J. Bruce Hoofnagle

[57] ABSTRACT

A device 22 for measuring the curvature of an object, such as a tapered shaft 24, includes a support plate 26 and a clamping mechanism 32 for supporting the shaft at one end 34 thereof a holding mechanism 60 retains an opposite end 78 of shaft 24 in a position such that the shaft is in a curved state. The curved state of shaft 24 can be attained by physically moving holding mechanism 60 or by placing a weight 80 on the mechanism. A first transducer 82 includes a slide 88 which is movable along a guide bar 86. A second transducer 98 includes slide 102 which is movable along a guide bar 100. Guide bar 100 is connected to slide 88 for movement therewith. A locator mechanism 114 is mounted on slide 102 for movement therewith and includes a pair of spaced pulleys 144 and 146 biasingly urged against opposite sides of shaft 24 and toward the axis thereof. Pulleys 144 and 146 are moved along the length of shaft 24 from end 34 to end 78 and transducers 82 and 98 develop voltage levels representative of incremental points along the shaft in the form of "X" and "Y" coordinates of an X—Y coordinate system. The voltage levels are processed into a data format representative of the curvature of shaft 24 for display of the curvature in a visual and/or printed format.

44 Claims, 10 Drawing Sheets

METHODS OF AND DEVICE FOR MEASURING THE CURVATURE OF AN OBJECT

BACKGROUND OF THE INVENTION

This invention relates to methods of and a device for measuring the curvature of an object and particularly relates to methods of and a device for measuring the curvature of shafts such as, for example, shafts of golf clubs.

Frequently, it is important to determine the curvature of objects in a static condition or in a dynamic condition to obtain data representative of, or to determine, characteristics of the object when the object is placed in a use environment. For example, in the sporting industry, such objects could include golf club shafts, fishing rods, fencing foils, archer's bows and the like. Also, in other industries, such as the construction industry or the space industry, many examples can be found where data relating to the static or dynamic curvature of an object would be valuable and necessary.

In the past, several techniques have been used to determine the curvature of objects. In some instances, strain gage devices have been used wherein incremental characteristics of wires of such devices change in response to the corresponding incremental curvature of the object being measured and such changes are determined as an indication of the curvature. Strain gage devices of this nature are noted in U.S. Pat. No. 3,991,745 which issued on Nov. 16, 1976.

In another technique which is employed to determine the curvature of objects, one end of a golf club shaft is mounted in a support with the remainder of the shaft extending in a cantilever fashion from the support. A weight is attached to the shaft at a location spaced from the support to cause the shaft to curve downwardly. Various measurements are taken and the shaft deflection, which is related to the slope of the bending angle of the shaft, is determined. The weight may be selectively placed at a variety of locations along the length of the shaft and a range of deflections may be determined. A process of this type is disclosed in U.S. Pat. No. 4,558,863 which issued on Dec. 17, 1985.

In the sport of golfing, it is advantageous for the golfer to use a matched set of clubs wherein the shaft of each club has characteristics which match the corresponding characteristics of the remaining clubs of the set. In many instances, golfers become accustomed to a personalized set of clubs wherein the feel and performance of the clubs enhances the golfer's playing of the game. When a golfer plans to use a new or different set of clubs, it is to the golfer's advantage to use clubs which have the same feel and performance of the older clubs to provide consistency in the golfer's game.

One technique for matching clubs is disclosed in U.S. Pat. No. 5,163,681 which issued on Nov. 17, 1992, wherein the butt end of the shaft of the club is mounted in a support and a dummy club head is mounted on the opposite cantilevered end of the shaft. The shaft is then oscillated over a range of frequencies by use of an oscillating means associated with the support. The excursion of the head from a stationary position is measured at each frequency and is plotted against the frequency of the head to form a curve which is defined as the "spectral response curve." By use of this data, matching clubs may be selected.

While the techniques described above provide data within the capability and complexity of the facilities used with such techniques, there remains a need for a device which will measure the incremental curvature of an object in a simple and comprehensive manner. In addition, there is a need for a device which will measure incrementally the curvature of a shaft along its natural curving axis even though the exterior of the shaft may not be of a consistent diameter from one end of the shaft to the other end. In particular, there is a need for a device for measuring the curvature of a shaft along its curving axis even though the shaft is tapered from one end to the other end.

SUMMARY OF THE INVENTION

In view of the foregoing needs, it is an object of this invention to provide a device for measuring the curvature of an object incrementally in a simple and comprehensive manner.

It is another object of this invention to provide a device which will measure the curvature of an object along the curving axis of the object notwithstanding variations in the topography of the object.

An additional object of this invention is to provide a device for measuring incrementally the curvature of a tapered shaft based on the curving axis of the shaft and not on the tapered configuration of the exterior of the shaft.

With these and other objects in mind, this invention contemplates a method for measuring the curvature of an object having a dimensional character which includes spaced portions of the object and an axis extending between the spaced portions to define a length thereof. Initially, the object is supported in its axis defining a curved state. Each incremental point of the axis along the length of the object is sensed as to its precise location relative to the sensing of other precise locations along the axis of the object. Data representative of the sensed precise locations is developed and is arranged in a format representative of the curvature of the object as determined by the curvature of the axis thereof.

This invention further contemplates a device for measuring the curvature of an object having a dimensional character which includes spaced portions of the object and an axis extending between the spaced portions to define a length thereof. The device includes structure for mounting and supporting the object in its curved state. A locating member is mounted for movement incrementally along the length of the object and is locatable in a symmetrical fashion about the axis thereof. A sensing unit is attached to the locating member for movement therewith and senses the precise location of the locating member along the axis of the object relative to the sensing of other locations along the axis of the object. The sensing unit produces data representative of the sensed precise locations which data is coupled to a processor for arranging the data in a format representative of the curvature of the object as determined by the curvature of the axis thereof. Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
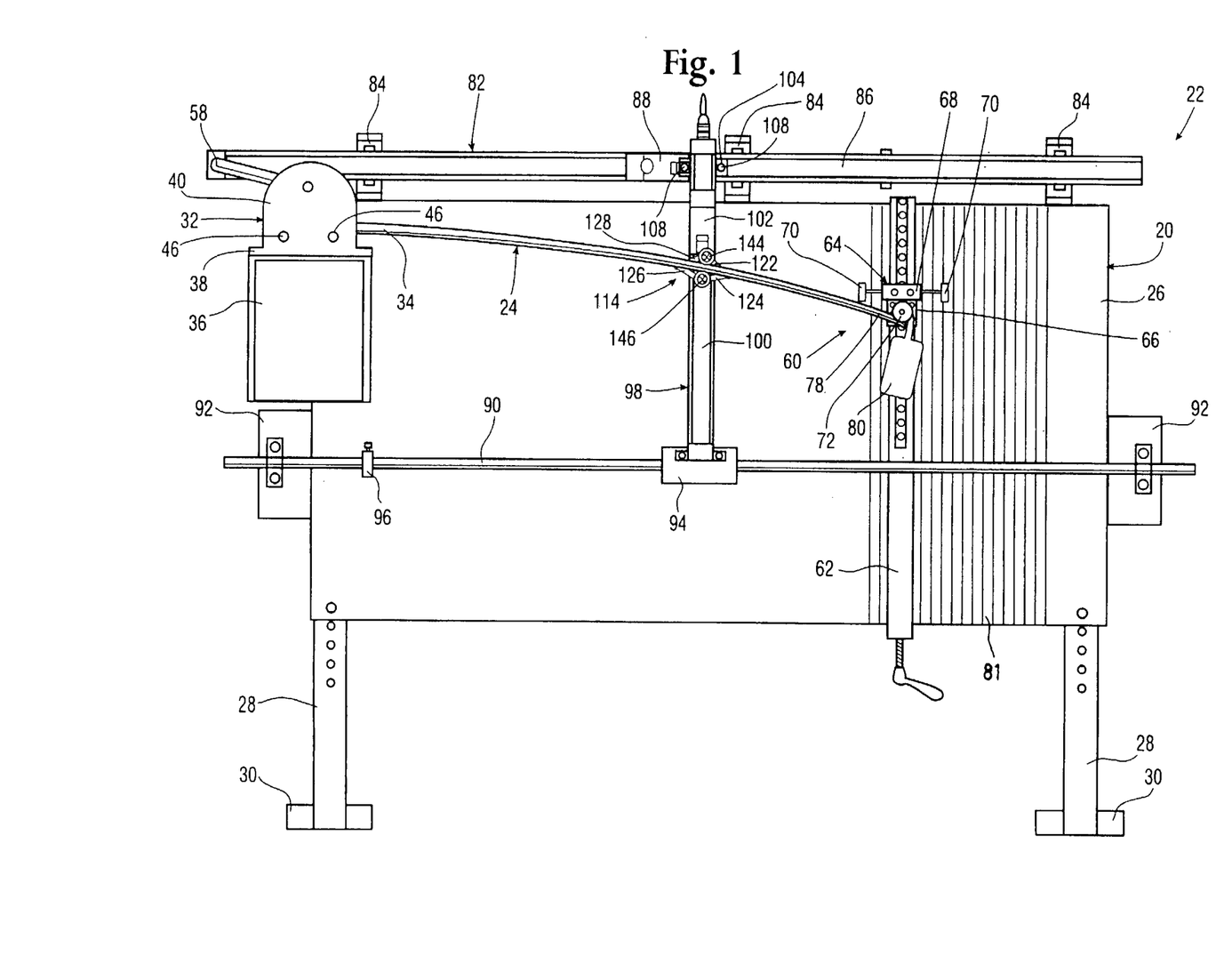
FIG. 1 is a front view of a mechanical portion of a device for measuring the curvature of an object in accordance with certain principles of the invention.

As illustrated in FIG. 1, a mechanical portion 20 of a curvature measuring device 22 supports an object, such as a tapered shaft 24, in a curved state for determination of the curvature of the shaft 24. Device 22 includes a support plate 26 which is mounted on a pair of spaced vertical stands 28 having feet 30 for supporting the device on a surface such as a floor (not shown).

It is noted that shaft 24 could be, for example, a non-metallic composite shaft of the type used in a golf club or a steel shaft also used in a golf club.

Figure 2:
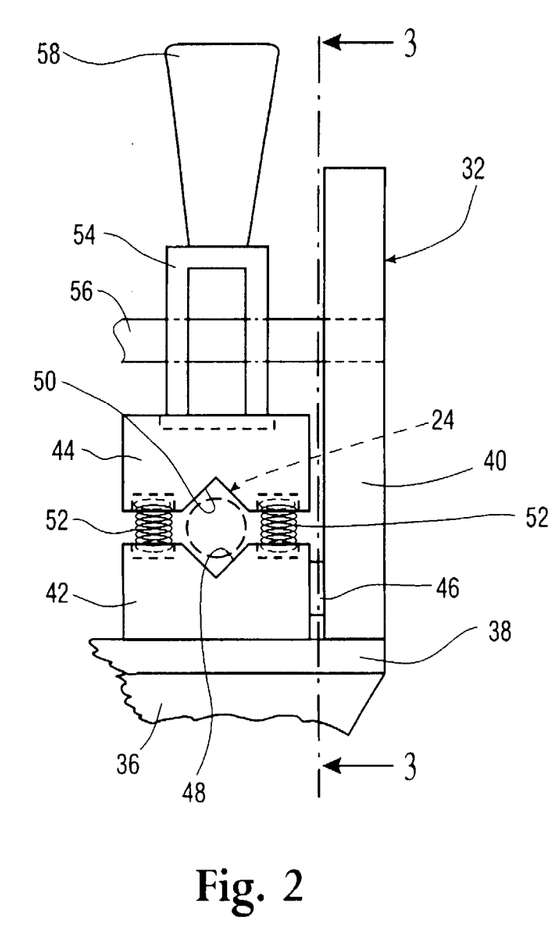
FIG. 2 is an end view of a clamping mechanism of the device of FIG. 1 for clamping a first portion of the object in accordance with certain principles of the invention.
Figure 3:
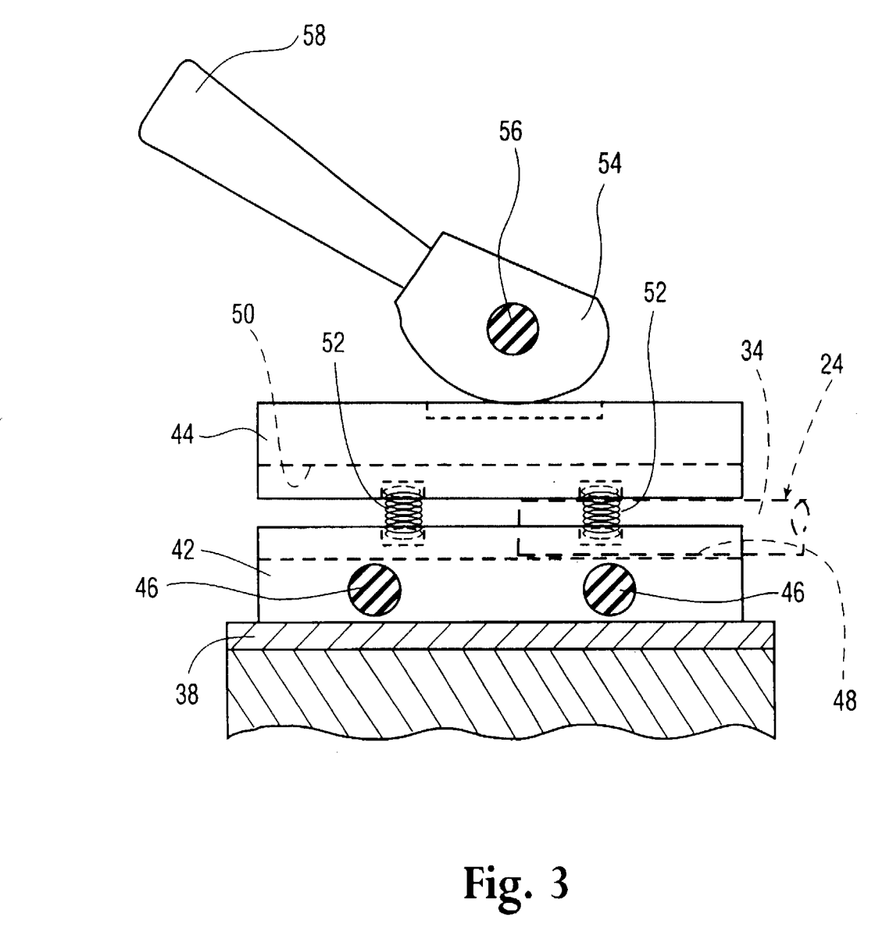
FIG. 3 is a view taken along line 3—3 of FIG. 2 showing a front view of the clamping mechanism of FIG. 2.

Device 22 also includes a clamping mechanism 32 which is mounted on support plate 26 and which is used to clamp a larger, or butt, end 34 of shaft 24 in preparation for measuring the curvature thereof. As shown in FIGS. 1 and 2, clamping mechanism 32 includes a support brace 36 which is secured to support plate 26 and further includes a platform 38, mounted on and secured to the top of the brace, and a vertical support 40 extending upwardly from a forward edge of the platform. As illustrated in FIGS. 2 and 3, clamping mechanism 32 further includes a lower clamping block 42 and an upper clamping block 44 located directly above the lower block. Lower block 42 is located on the top of platform 38 and is attached to vertical support 40 by a pair of rods 46. Blocks 42 and 44 are formed with opposing "V" shaped grooves 48 and 50, respectively, from one end to the other thereof. Four compression springs 52 are located within spaced interfacing pockets of blocks 42 and 44 to normally maintain the blocks in spaced relation. An eccentric element 54 is attached to vertical support 40 by virtue of a rod 56 and has a handle 58 attached thereto.

When using clamping mechanism 32, handle 58 if moved so that eccentric element 54 is positioned to allow upper block 44 to be spaced from lower block 42 sufficiently for positioning butt end 34 of shaft 24 within the space between "V" shaped grooves 48 and 50. Handle 58 is then manipulated to move upper block 44 toward lower block 44 and to clamp butt end 34 of shaft 24 between the blocks. Due to the eccentricity of eccentric element 54, blocks 48 and 50 are held in the clamped position to retain butt end 34 of shaft 24 in the clamped arrangement.

Figure 4:
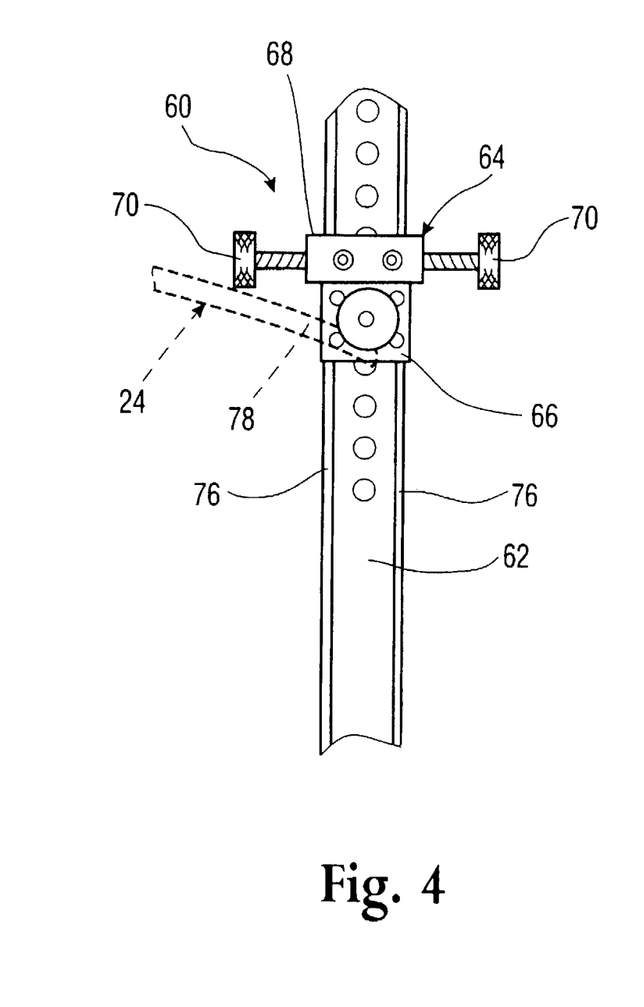
FIG. 4 is a front view of a holding mechanism of the device of FIG. 1 for holding a second portion of the object, spaced from the first portion, so that the object is placed in a curved state from the first portion to a second portion thereof in accordance with certain principles of the invention.
Figure 5:
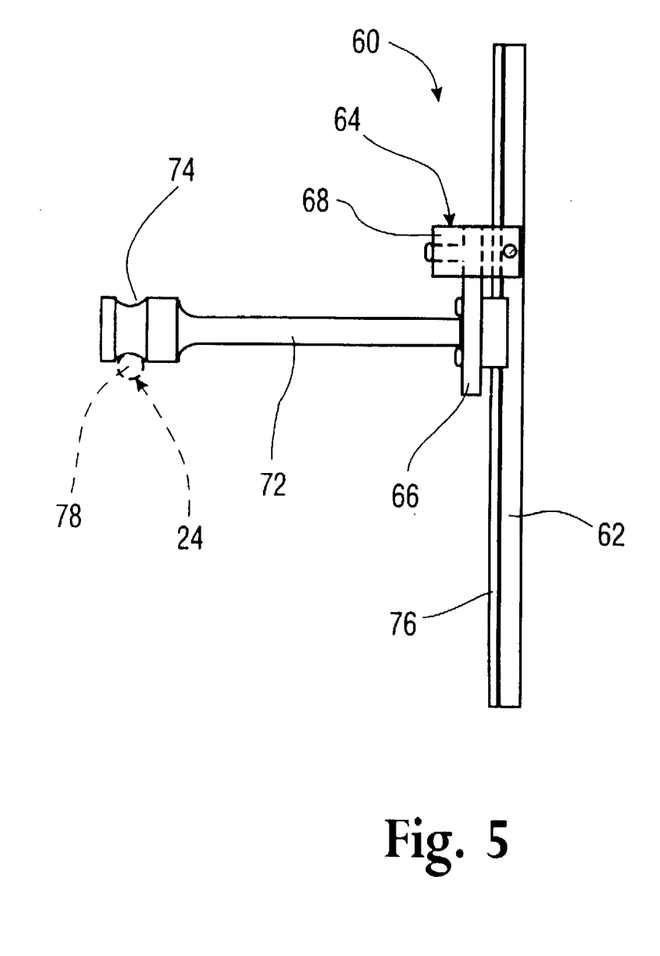
FIG. 5 is a side view of the holding mechanism of FIG. 4.

Referring to FIG. 1, a holding mechanism 60 includes a positioning bar 62 which is mounted selectively in a vertical orientation on support plate 26. As viewed in FIGS. 4 and 5, holding mechanism 60 further includes a slide mechanism 64 having a slide bar 66 and a locking bar 68 which is attached to the slide bar. A pair of locking screws 70 are mounted in threaded holes (not shown) formed in opposite sides of locking bar 68. As shown in FIG. 5, a holding rod 72 is attached at one end thereof to slide bar 66 and extends therefrom in cantilever fashion. The free end of rod 72 is formed with an annular groove 74. Slide bar 66 is located on a pair of rails 76 on opposite sides of positioning bar 62 for vertical movement therealong. After slide mechanism 64 has been located at a selected position along positioning bar 62, screws 70 are adjusted inwardly to engage the side of the positioning bar and thereby retain the slide mechanism in the selected position.

It is noted that positioning bar 62 and slide bar 66 are available commercially as a unit, identified by Model No. LWL 12 . . . /M3, from IKO International, Inc., Fox Hill Industrial Park, 91 Walsh Drive, Parsippany, N.J. 07054.

In a fixed-displacement technique for using holding mechanism 60, shaft 24 is located in a position where the axis of the shaft is in a horizontal orientation and a narrow end 78 of tapered shaft 24 is located in the underside of groove 74 (FIG. 5). The user 22 moves slide mechanism 64 downwardly over positioning bar 62 for a selected distance to establish a static curvature in shaft 24 representative of the distance over which the slide mechanism was moved. Thereafter screws 70 are adjusted to retain slide mechanism 64 in place with the shaft being retained in the selected curvature. Device 22 is then used in a manner to be described hereinafter to determine the curvature of shaft 24.

In a weight-displacement technique for using holding mechanism 60, shaft 24 is located in the position where the axis of the shaft is in the horizontal orientation and the narrow end 78 of the shaft is placed in the underside of groove 74 of rod 72. A weight 80, for example, of five pounds is then hung from rod 72. This causes shaft 24 to bend in a dynamic manner. Five pounds is a golfing industry standard as the appropriate weight for weight 80 to represent the bending of a golf club shaft when the club is placed in conventional use by a golfer. As shaft 24 is bending due to the placement of weight 80 on rod 72, sliding mechanism 64 is moving downwardly over positioning bar 62 to a rest position. Screws 70 are then adjusted to retain sliding mechanism 64 in the rest position which is representative of the bend of shaft 24. Device 22 is then used in the manner to be described hereinafter to determine the curvature of shaft 64.

Support plate 26 is formed with a plurality of marker lines 81 on the front face thereof to facilitate the locating and positioning of holding mechanism 60 on the support plate to accommodate different lengths of shafts 24. For example, if a shaft 24 is longer than the shaft illustrated in FIG. 1, holding mechanism 60 is moved to the right an appropriate distance so that the narrow end 78 of the longer shaft can be located in the underside of groove 74 of rod 72 as illustrated in FIG. 4.

Referring to FIG. 1, device 22 further includes a horizontal transducer 82 which is attached to supports 84 mounted at the top of support plate 26. Transducer 82 extends in a horizontal orientation from one side of plate 26 to the other side of the plate and further includes a guide bar 86 and a slide 88 mounted on the slide bar for movement therealong. Transducer 82 is an electrically powered device which develops an output voltage in response to movement of slide 88 along guide bar 86 in the manner to be described hereinafter. Transducer 82 is commercially available, for example, as Model No. PK B 1250 L from GEFRAN Inc., 122 Terry Drive, Newtown, Penna. 18940.

A guide rail 90 is mounted at opposite ends thereof to a pair of spaced supports 92 located and attached to opposite sides of support plate 26. A ball bearing slide 94 is mounted on guide rail 90 for movement therealong and an adjustable stop 96 is also mounted on the guide rail to limit selectively the leftward travel of slide 94. A vertical transducer 98 is attached at the bottom thereof to slide 94 and at the top thereof to slide 88 of transducer 82. Transducer 98 functions in the same manner as transducer 82 and is available commercially, for example, as Model No. PK B 300 L also from GEFRAN Inc. as noted above.

Transducer 98 includes a guide bar 100 and a slide 102 mounted on the guide bar for movement therealong. Transducer 98, by virtue of its attachment at the top and bottom thereof, can be moved from stop 96 toward the right side of support plate 26. During this movement, slide 88 of transducer 82 is moved along guide bar 86 by virtue of its attachment to the top of guide bar 100. In addition, slide 102 can be moved independently along guide bar 100 as transducer 98 is being moved to the right as viewed in FIG. 1.

Figure 10:
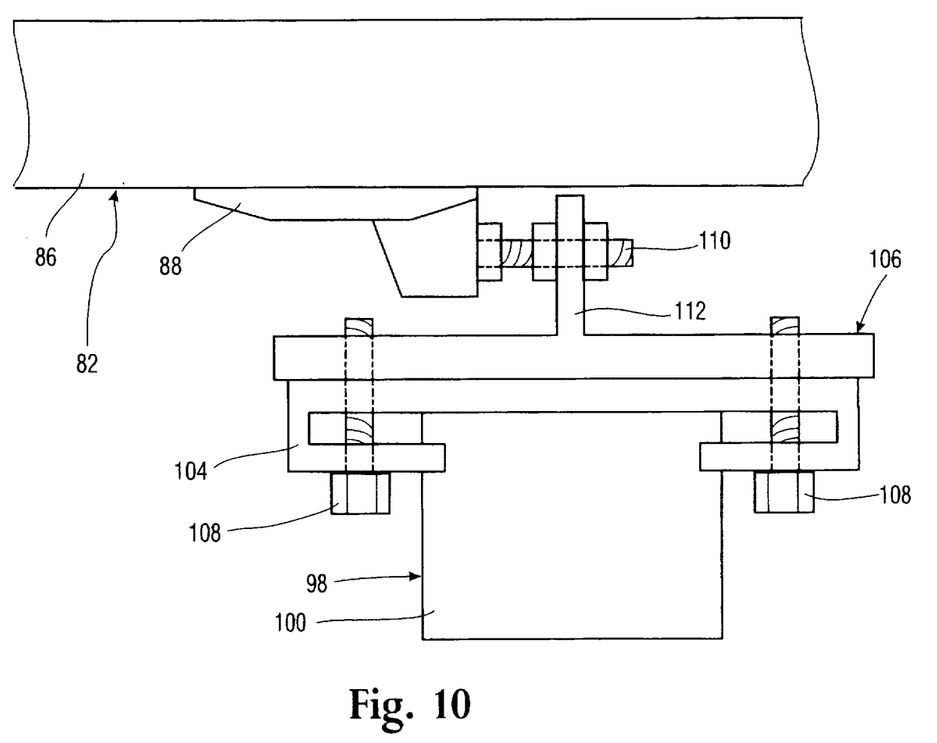
FIG. 10 is a plan view of a portion of the device of FIG. 1 showing the manner of mechanically coupling the vertical transducer of FIG. 9 to a horizontal transducer of the device of FIG. 1 in accordance with certain principles of the invention.

Referring to FIG. 10, a bracket 104 is attached to guide bar 100 of vertical transducer 98 and a "T" bar 106 is attached to the bracket by use of a pair of bolts 108. A threaded stud 110 extends from slide 88 of horizontal transducer 82 and is attached to a vertical leg 112 of "T" bar 106. In this manner, slide 88 of transducer 82 is attached to guide bar 100 of transducer 98 to effect the movement of slide 88 when guide bar 100 is moved as noted above.

Figure 6:
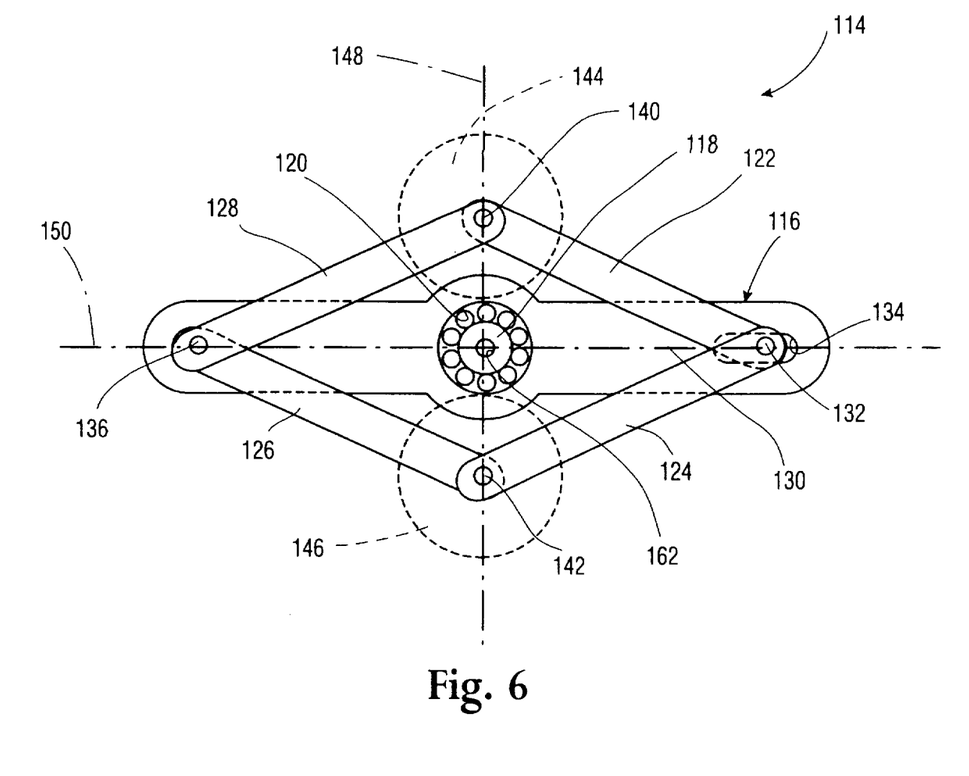
FIG. 6 is a front view of a portion of a locator mechanism of the device of FIG. 1 for locating precisely incremental points along the axis of the object between the first portion and the second portion thereof in accordance with certain principles of the invention.
Figure 7:
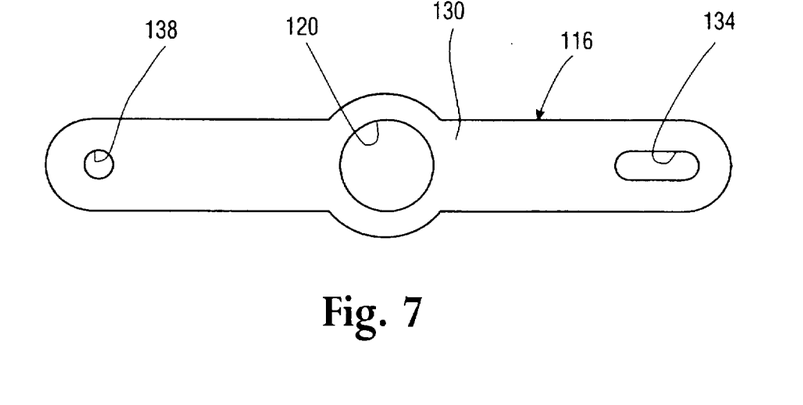
FIG. 7 is a front view of a support member of the locator mechanism of FIG. 6.

Referring to FIG. 1, a locator mechanism 114 is attached to slide 102 of vertical transducer 98 for movement with the slide. As shown in FIG. 6, locator mechanism 114 includes a support member 16 (FIG. 7) and a ball bearing 118 mounted in a central hole 120 in the support member. Four linkage arms 122, 124, 126 and 128 are located in a slight forward spaced relation to a front face 130 of support member 116. Overlapping ends of arms 122 and 124 are connected by a rod 132 passing through aligned holes in the ends of the arms and also passing through an elongated slot 134 (FIG. 7) formed through support member 116. Overlapping ends of arms 126 and 128 are connected by a rod 136 passing through aligned holes in the ends of the arms and through a hole 138 (FIG. 7) formed through support member 116. Overlapping ends of arms 122 and 128 are connected by a rod 140 and overlapping arms 124 and 126 are connected by a rod 142.

Figure 8:
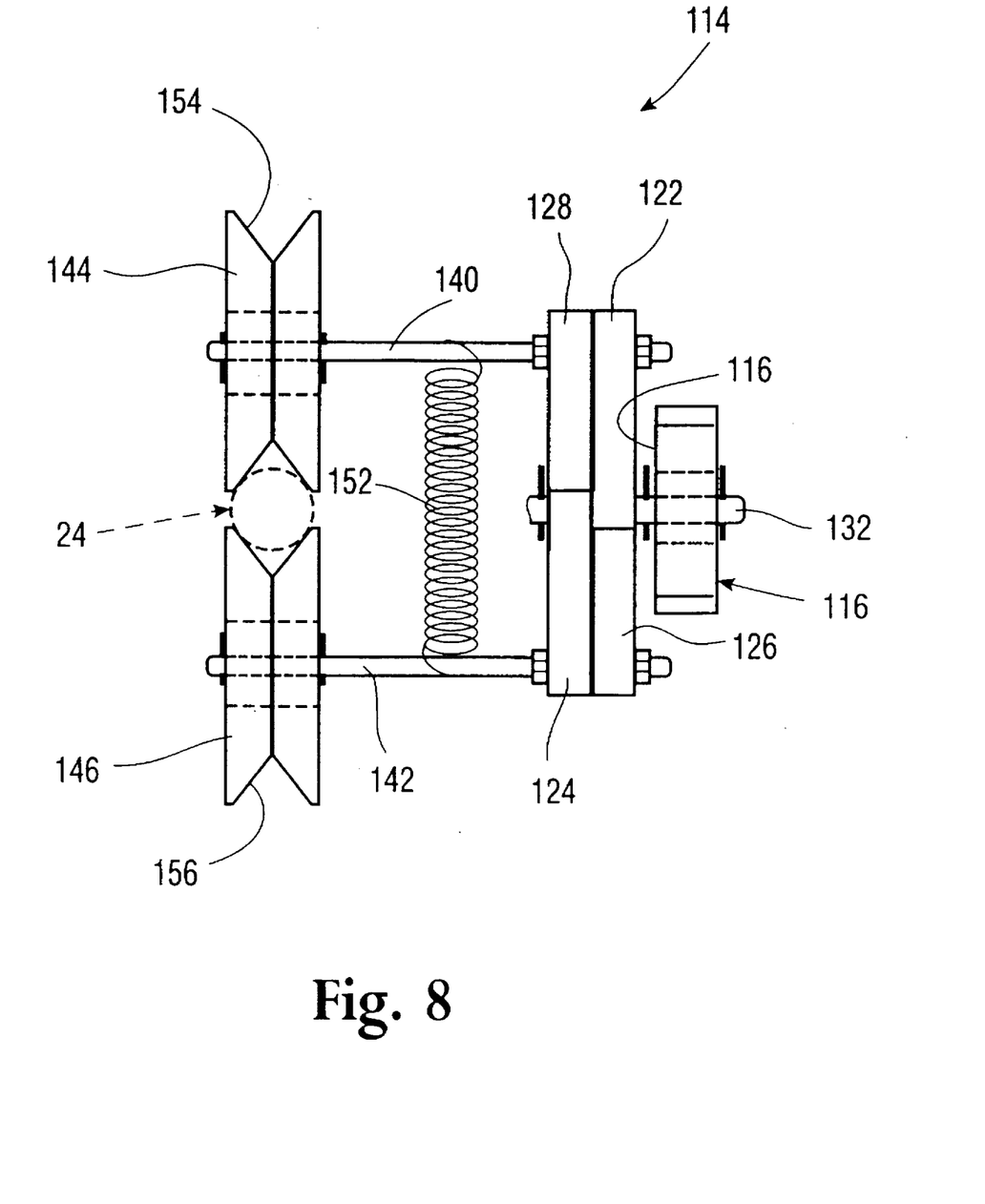
FIG. 8 is a side view of the locator mechanism of FIG. 6.

As shown in FIGS. 6 and 8, a first pulley 144 is attached to a forward end of rod 140 and a second pulley 146 is attached to a forward end of rod 142. As shown in FIG. 6, pulleys 144 and 146 are located in spaced alignment with each other along a centerline 148 which is perpendicular with a longitudinal centerline 150 of support member 116. As viewed in FIG. 8, a spring 152 is attached at opposite ends thereof to rods 140 and 142 to normally urge the rods toward each other. Further, pulleys 144 and 146 are formed with annular "V" shaped grooves 154 and 156, respectively, for receipt of shaft 24 therebetween. Spring 152 also normally urges pulleys 144 and 146 toward each other and about the adjacent portion of shaft 24 such as shown, for example, in FIG. 1.

Figure 9:
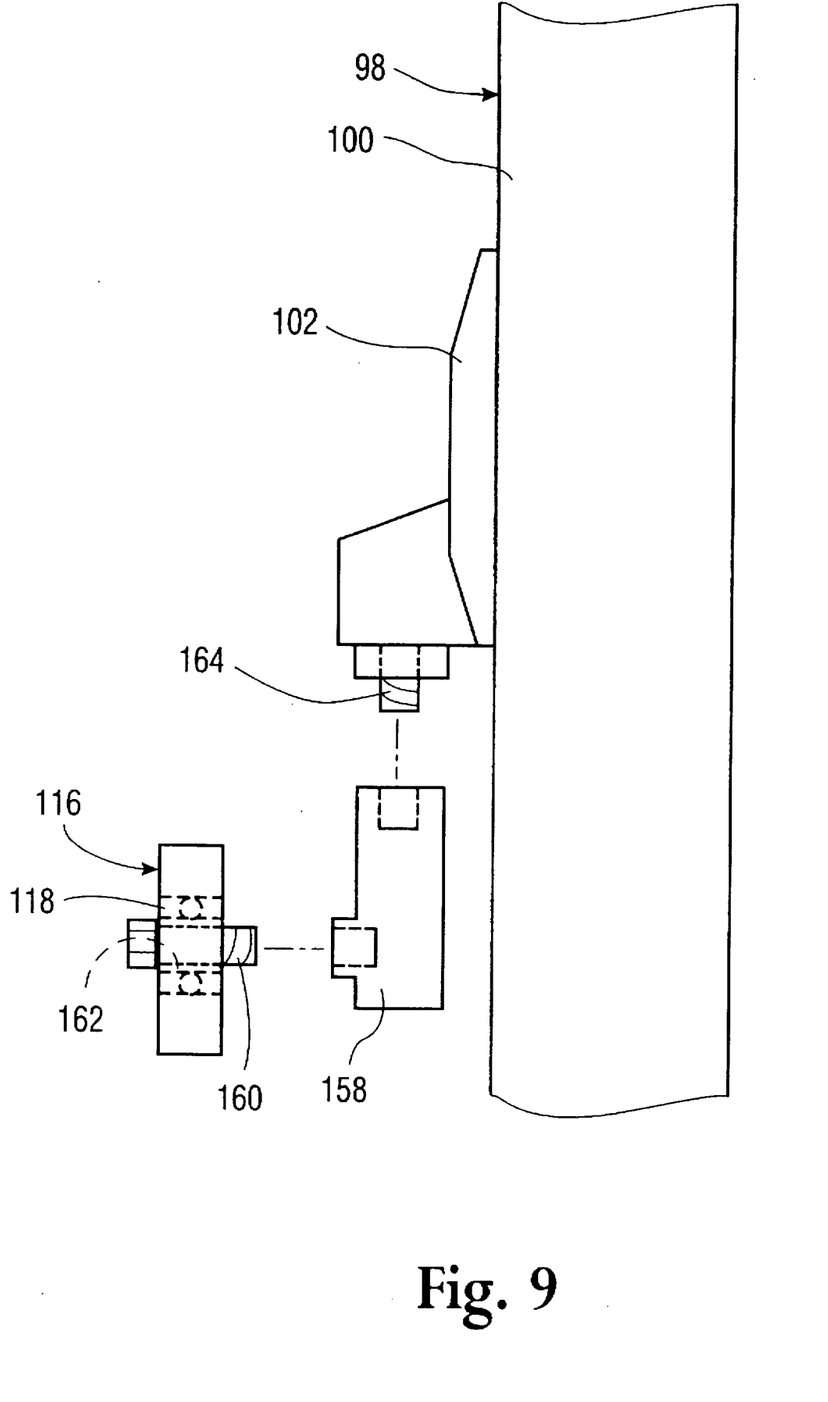
FIG. 9 is a side view of the manner of mechanically coupling the locator mechanism of FIG. 6 to a vertical voltage transducer of the device of FIG. 1 in accordance with certain principles of the invention.

Referring to FIG. 9, support member 116 is attached to a coupling element 158 by use of a threaded bolt 160 which is passed through an axial hole 162 formed through ball bearing 118. Slide 102 of transducer 98 is also attached to coupling element 158 by use of a threaded stud 164. In this manner, locator mechanism 114 is attached to and movable with slide 102 during the course of use of device 22 in the manner described hereinafter.

As noted above, spring 152 normally urges pulleys 144 and 146 toward each other. In order to separate pulleys 144 and 146 so that the pulleys can be positioned over shaft 24, the outboard ends of the junctures of (1) arms 122 and 124 on the one hand and (2) arms 126 and 128 on the other hand are urged toward each other along centerline 150. The urging action can be accomplished, for example, by placing the thumb of one hand on one juncture and the index finger of the same hand on the other juncture and moving the thumb and index finger toward each other. Since rod 132 is located in elongated slot 134 of support member 116, the pin is allowed to move within the slot toward the center of the support member whereby the junctures of (1) arms 122 and 128 on the one hand and (2) arms 124 and 126 on the other hand move away from each other along centerline 148. As a result of this action, pulleys 144 and 146 are moved apart against the bias of spring 152 a sufficient distance to allow the pulleys to be placed over shaft 24.

In-preparation for the use of the mechanical portion 20 of device 22, two power supplys 166 and 168 (FIG. 11) are turned on to apply twelve volts to each of the transducers 82 and 98, respectively. Power supplys 166 and 168 are commercially available, for example, as Model No. PR3 from Tripp Lite, 500 North Orleans, Chicago, Ill. 60610. Thereafter, butt end 34 of shaft 24 is clamped in clamping mechanism 32 in the manner described above. Locator mechanism 114 is then manipulated to position pulleys 144 and 146 over shaft 24, as described above, and the mechanism is moved fully to the left from the position shown in FIG. 1. This leftmost position is a "start" position for locator mechanism 114 for the collection of data regarding the measuring of the curvature of shaft 24. Narrow end 78 of shaft 24 is placed against the underside of groove 74 of holding rod 72. As described above, holding mechanism 64 is either moved downwardly for a selected distance or weight 80 is placed on rod 72 to facilitate downward movement of the mechanism. In either option, shaft 24 assumes a curvature as shown in FIG. 1 which is to be measured. Screws 70 are adjusted to secure holding mechanism 60 in place and thereby retain shaft 24 in the assumed curvature during the measuring process.

Thereafter, a data acquisition process which uses a 486DX, IBM compatible computer (not shown) is initiated by use of a keyboard command to prepare the computer for the receipt of data from tranducers 82 and 98. Referring to FIG. 1, locator mechanism 114 is manually moved along shaft 24 from the "start" position at the clamped butt end 34 of the shaft to the narrow end 78 thereof. It is noted that by virtue of pulleys 144 and 146 being located on opposite sides of shaft 24, locator mechanism 114 will follow the axis of the shaft to measure the true axial curvature of the shaft and is unaffected by the inwardly tapering structure of the shaft from the butt end 34 to the narrow end 78 thereof.

Figure 13:
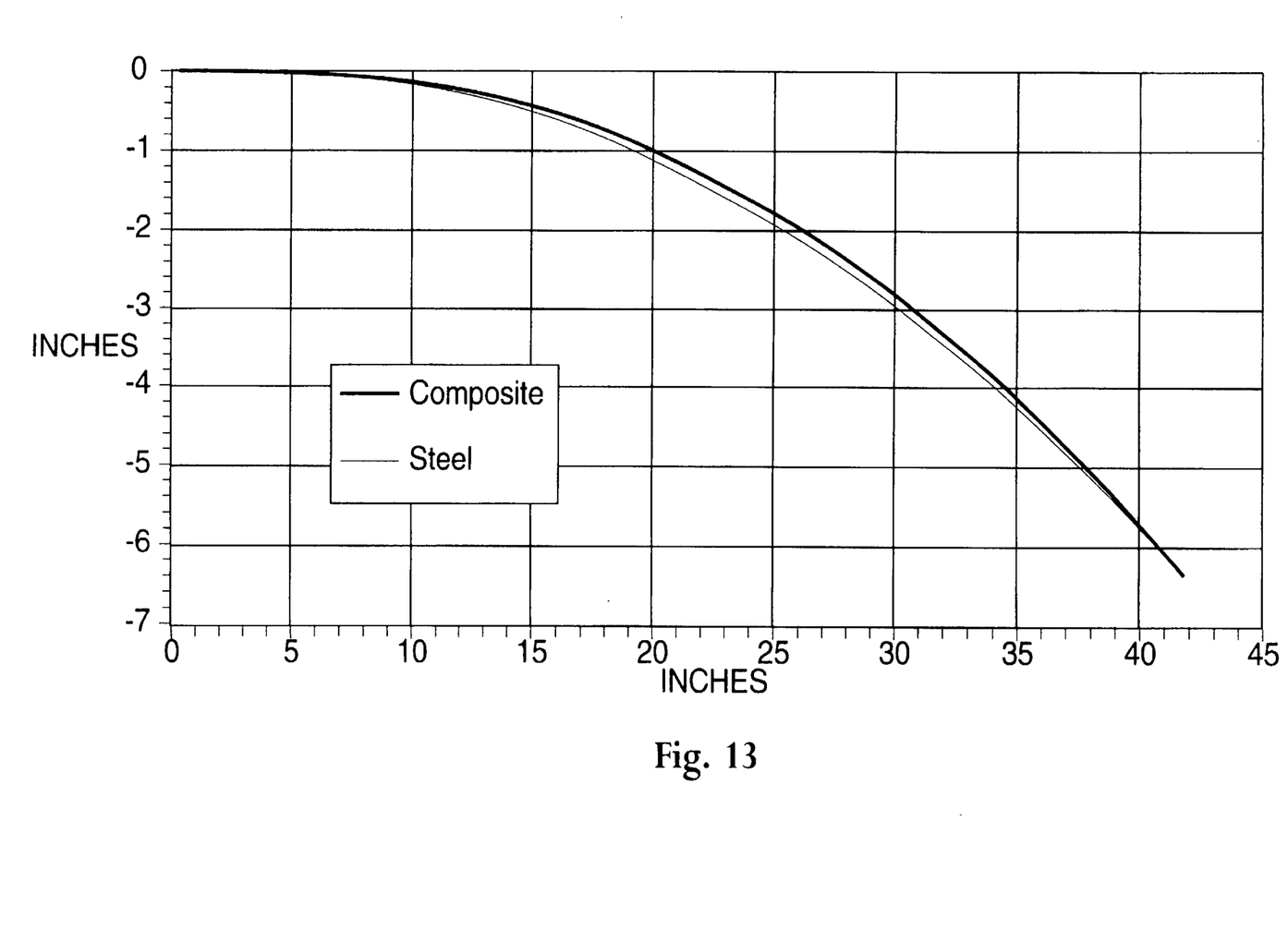
FIG. 13 is a graph showing the comparative plots of the curvatures of two objects such as a composite non-metallic shaft and a steel shaft.

As locator mechanism 114 is moved along shaft 24, slide 88 of transducer 82 is moved along guide bar 86 whereby the transducer develops changing analog voltage levels between zero and twelve volts at successive incremental points along the guide bar which are representative of successive incremental points on an "X" coordinate of a graph (FIG. 13). It is noted that the above-noted "starting" point of locator mechanism 114 is equivalent to a point on the "X" coordinate of the graph where "X" equals zero. As slide 88 is moved, slide 102 of transducer 98 moves along guide bar 100 whereby the transducer develops changing analog voltage levels between zero and twelve volts at successive incremental points along the guide bar which are representative of successive incremental points on a "Y" coordinate of the graph (FIG. 13). Thus, by use of the mechanical portion 20 of device 22, incremental "X" and "Y" coordinates representing the axial curvature of shaft 24 can be obtained in the form of analog voltage levels.

Figure 11:
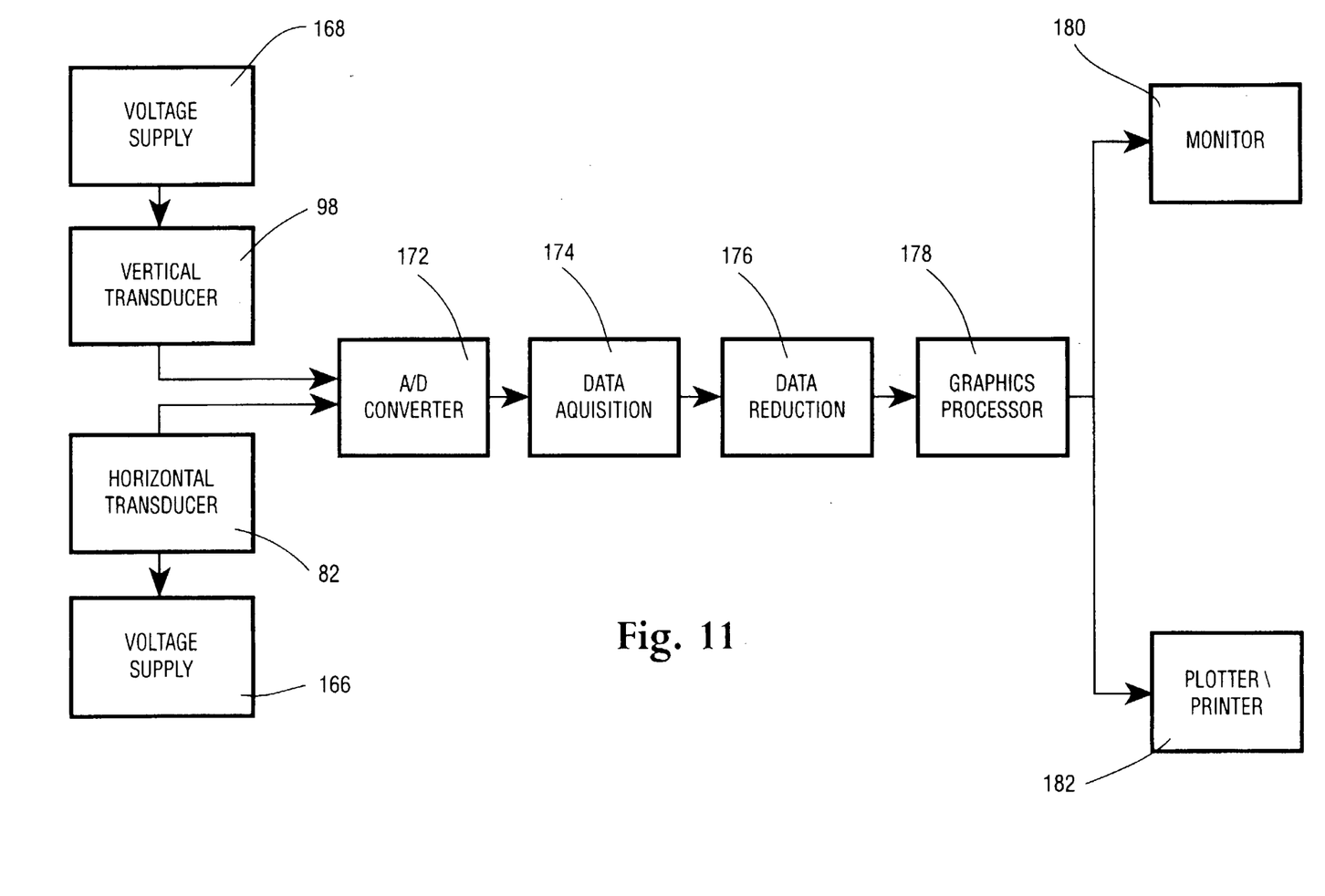
FIG. 11 is an electrical block diagram of a system which forms an electrical portion of the device in combination with the mechanical portion thereof shown in FIG. 1 and which receives data from the transducers of FIGS. 9 and 10 and prepares the data for display of a graph of the object curvature on a monitor of the system and/or for controlling a printer of the system for printing a graph of the object curvature in accordance with certain principles of the invention.

Referring to FIG. 11, an electrical portion 170 of device 22 includes the voltage developing and voltage output portions of horizontal transducer 82 and vertical transducer 98 which are powered by voltage supplies 166 and 168, respectively. The outputs of transducers 82 and 98 are coupled to an analog-to-digital converter 172 within the computer which converts the analog voltages to digital signals representative of the curvature of shaft 24. Data, in the form of the digital signals, is fed to a data acquisition program 174 in the computer and is stored, for example, in a DOS file located in the computer. Program 174 is programmed to record the developed data within a given amount of time such as, for example, three seconds. Converter 172 is available commercially, for example, as model DT2831G from Data Translation, Inc., 100 Locke Drive, Marlboro, Mass. 01752. Data acquisition program 174 is available commercially, for example, under the name "Global Lab" from Data Translation, Inc. whose address is noted above.

Data acquisition program 174 also provides for the calibration of the digital signals to read in inches so that any curve ultimately plotted on a graph, such as the graph of FIG. 13, will be plotted in inches.

Typically, the data is recorded at a very high rate such as, for example, 2000 bits of data per second for each of the transducers 82 and 98. Since there are two transducers, and the acquisition period is three seconds as noted above, 12000 pieces of data are collected which equates to 6000 pairs of coordinates being compiled for plotting the curve. This is an exceptionally large number of plot points which would require a long period to run in the plotting process. To compensate for the large amount of data to be processed, the data is processed through a data reduction program 176 in the computer where the 6000 pairs of coordinates are effectively reduced to a more realistic number for plotting the curve. For example, if slide 88 of transducer 82 travels thirty-five inches over guide bar 86 during the data collection process, and data is collected at successive intervals of 0.2 inch along the guide bar, the 6000 pairs of coordinates would be reduced to one hundred and seventy-five pairs of coordinates to be plotted. This provides a greatly reduced number of coordinates to be plotted and is still provides a substantial number of plot points in the generation of the plotted curve.

Figure 12:
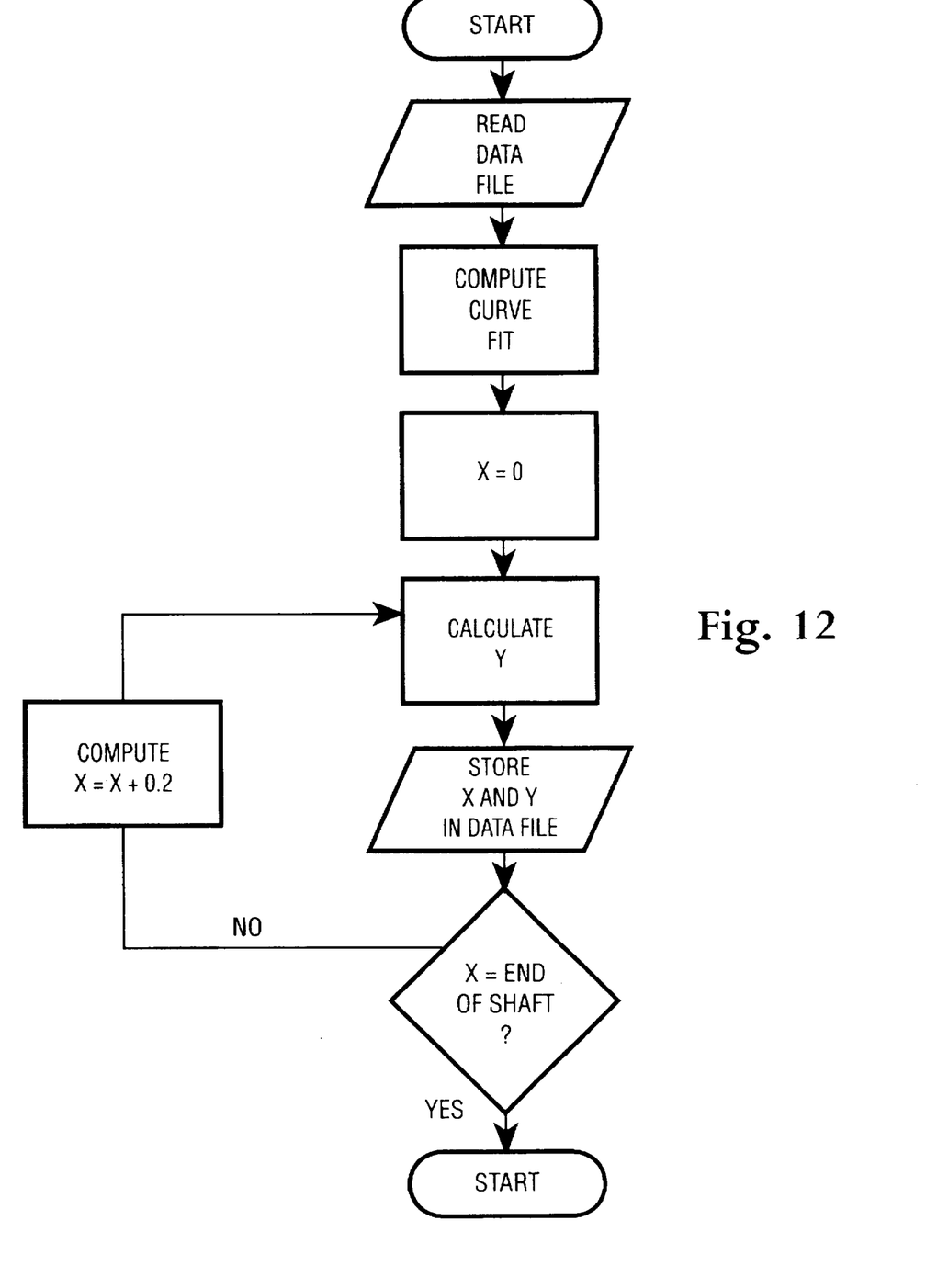
FIG. 12 is a flow diagram showing the steps of a software process within a data reduction portion of the system of FIG. 11 for processing the data received from the transducers of FIGS. 9 and 10 in accordance with certain principles of the invention.

Referring to FIG. 12, a flow chart is illustrated representing a FORTRAN program which accomplishes the tasks of the data reduction program 176 (FIG. 11). Initially, the FORTRAN program reads the data file to determine the data collected and stored as noted above. The program then fits a curve based on the data which has been read and in accordance with the following equation:

$$Y = C_1 + C_2X + C_3X^2 + \ldots + C_{n+1}X^n$$

where $C_i$ (i=1, 2, ..., n+1) represents constants and "n" is the degree of the curve fit as specified by the user of device 22. The program then begins to process the data at the point of the "X" coordinate where "X" equals zero which is the "starting" point of movement of locator mechanism 114 as noted above. The value of the "Y" coordinate, when "X" equals zero, is then computed and the "X" and "Y" coordinates are stored in a data file. The program then compares the value of the "X" coordinate being processed with a coordinate value representing the value of the "X" coordinate at the end of shaft 24. If the value of the processed "X" coordinate equals the value of the end-of-shaft "X" coordinate, the processing is stopped and the compilation of data is complete. If the value of the processed "X" is less than the end-of-shaft "X" coordinate, a value of "0.2" is added to the value of the processed "X" coordinate and the value of the next incremental "Y" coordinate is determined in the same fashion as described above with respect to the immediately preceding "Y" coordinate value. Eventually, the required number of values of the "X" and "Y" coordinates are determined and stored in the data file.

The data stored in the data file of the data reduction program 176, as shown in FIG. 11, is then imported into a graphics program 178 within the computer where the graphics program plots the data for display of the shaft curvature on a computer monitor 180 and also for controlling a printer 182 to print a hard copy of the shaft curvature in a graph format such as shown in FIG. 13.

Graphics program 178 is commercially available, for example, under the name "Delta Graph Professional" from Delta Point, 2 Harris Court, Suite B-1, Monterey, Calif. 93940. Monitor 180 is commercially available, for example, as Model No. CM14SAS from Tatung, 22 Chungshan North Road, 3rd Sec., Taipei, Taiwan. Printer 182 is commercially available, for example, under the designation HP Desk Jet 550C from Hewlett-Packard Company, 18110 SE 34th Street, Camas, Wash. 98607.

As noted above, shaft 24 is tapered inwardly from end 34 to end 78 thereof. If an attempt is made by use of conventional facilities to determine the curvature of a tapered shaft, which is incidentally straight, the tapered structure will cause the facilities to "read" a curvature due to the incremental changes in the axially lateral dimensions of the shaft. If the tapered shaft is truly curved, the conventional facilities will "read" a curvature which is greater than the actual curvature due the effect that the tapered structure introduces into the ultimate reading.

As noted above, device 22 includes locator mechanism 114 with pulleys 144 and 146 located on opposite sides of shaft 24. Pulleys 144 and 146 are equally spaced from the axis of shaft 24 and literally follow the axis when locator mechanism 114 is moved along the shaft in the manner noted above. In this manner, locator mechanism 114, and effectively slide bar 102 of transducer 98, is measuring the curvature of the axis unaffected by the tapering structure of the exterior of shaft 24 and thereby provides a true reading of the curvature of the shaft.

In the playing of golf, there is an advantage to the golfer when the different clubs of a set are matched in the context of the consistency of the reactionary feel experienced by the golfer when using the clubs. Thus, from the club manufacturer's and the users standpoint, it is important that provision be made to offer matched sets of clubs in the manufacturer's product line.

In some instances, manufacturers offer clubs having shafts composed of or made from different materials such as, for example, a club having a steel shaft and a club having a non-metallic composite shaft. If a golfer has been using steel-shaft clubs with a comfortable feel to which the golfer is accustomed, and the golfer wishes to start using clubs with non-metallic composite shafts, it is important to the golfer to locate clubs having non-metallic shafts which have the same comfortable feel as the steel-shaft clubs. Thus, it is important for the manufacturer to be able to determine matching characteristics of clubs having shafts composed of or made from different materials as noted above.

Device 22 offers a facility for determining the curvature of shafts of the same or different materials in the manner described above where the derived data can be used to provide matched clubs. For example, in FIG. 13, a graph is plotted using data obtained by use of device 22 in the manner described above. As shown in the graph of FIG. 13, data is obtained by measuring, for example, a steel shaft and a non-metallic composite shaft. The data is plotted on the graph to provide a visual display of the matching nature of the two shafts of different materials with respect to the curvature characteristic.

In general, the above-identified embodiment is not to be construed as limiting the breadth of the present invention. Modifications, and other alternative constructions, will be apparent which are within the spirit and scope of the invention as defined in the appended claims.

What is claimed is:

1. A device for measuring the curvature of an object having a dimensional character which includes spaced portions of the object and an axis extending between the spaced portions of the object to define a length thereof, which comprises:

mounting structure for placing and maintaining the object in a curved state;

a locating member mounted for incremental movement along the length of the object;

a sensing unit attached to the locating member for movement therewith for sensing the precise location of the locating member along the axis of the object relative to the sensing of other locations along the axis of the object;

the sensing unit produces data representative of each precise location sensed; and a processor for arranging the data in a format representative of the curvature of the object.

2. The device as set forth in claim 1 wherein at least one of the spaced portions of the object represents an end thereof, which further comprises:

a clamping mechanism for clamping the end of the object during the movement of the locating member along the length of the object.

3. The device as set forth in claim 2 wherein the end of the object is a first end and the other one of the spaced portions is a second end of the object, which further comprises:

a holding mechanism for holding the second end of the object in such a manner that the object is curved from the clamped first end to the held second end.

4. The device as set forth in claim 1 wherein at least one of the spaced portions of the object represents an end thereof, which further comprises:

a holding mechanism for engagement with and holding the end of the object during movement of the locating member along the length of the object.

5. The device as set forth in claim 1, wherein the sensing unit comprises:

a first transducer for developing an indicator representative of the instantaneous location of the locating member along an "X" coordinate of an X—Y coordinate system; and a second transducer for developing an indicator representative of the instantaneous location of the locating member along a "Y" coordinate of the X—Y coordinate system.

6. The device as set forth in claim 5 wherein the first transducer comprises:

a guide bar; and a slide mounted for movement along the guide bar where the instantaneous location of the slide along the guide bar determines the development of the indicator representative of the "X" coordinate.

7. The device as set forth in claim 5 wherein the second transducer comprises:

a guide bar; and a slide mounted for movement along the guide bar where the instantaneous location of the slide along the guide bar determines the development of the indicator representative of the "Y" coordinate.

8. The device as set forth in claim 6 wherein the second transducer comprises:

a guide bar; and a slide mounted for movement along the guide bar where the instantaneous location of the slide along the guide bar determines the development of the indicator representative of the "Y" coordinate.

9. The device as set forth in claim 8 wherein the slide of the first transducer is attached to the guide bar of the second transducer.

10. The device as set forth in claim 7 wherein the locating member is attached to the slide of the second transducer.

11. The device as set forth in claim 1 wherein the data produced by the sensing unit is in the form of electrical signals which are processed by the processor into a format representative of the curvature of the object.

12. The device as set forth in claim 11 wherein the electrical signals represent "X" and "Y" coordinates of a X—Y coordinate system.

13. The device as set forth in claim 11 wherein the electrical signals are initially developed as voltage levels indicative of the location of the locating member along the length of the object.

14. The device as set forth in claim 13, which further comprises:

an analog-to-digital converter which converts the voltage levels from an analog voltage format to a digital signal format to develop digital signals representative of the curvature of the object.

15. The device as set forth in claim 14, which further comprises:

a data acquisition unit for collecting and storing the digital signals developed by the analog-to-digital converter.

16. The device as set forth in claim 15, wherein the data acquisition unit calibrates the digital signals to indicate the relative location of incremental points along the length of the object in a selected measurement unit.

17. The device as set forth in claim 15, which further comprises:

a data reduction unit for selecting less than all of the digital signals to represent the curvature of the object.

18. The device as set forth in claim 15, which further comprises:

a graphics processor unit for processing the digital signals for the development of control signals in accordance with the data represented by the digital signals.

19. The device as set forth in claim 18, which further comprises:

a monitor responsive to the control signals for displaying visually a curve representative of the curvature of the object.

20. The device as set forth in claim 18, which further comprises;

a printer responsive to the control signals for printing in a graphical format a curve representative of the curvature of the object.

21. The device as set forth in claim 1 wherein the object is a shaft formed in the curvature between the spaced portions thereof.

22. The device as set forth in claim 21 wherein the shaft is tapered inwardly toward the axis thereof between the spaced portions thereof.

23. A device for measuring the curvature of an object having a dimensional character which includes spaced portions of the object and an axis extending between the spaced portions of the object to define a length thereof, which comprises:

mounting structure for supporting the object in a curved state;

a locating member mounted for incremental movement along the length of the object;

a sensing unit attached to the locating member for movement therewith for sensing the precise location of the locating member along the axis of the object relative to the sensing of other locations along the axis of the object;

the sensing unit produces data representative of each precise location sensed;

a processor for arranging the data in a format representative of the curvature of the object; and a clamping mechanism for clamping the end of the object during the movement of the locating member along the length of the object, which comprises:

a first block;

a second block situated in spaced relation to the first block;

a biasing facility for normally urging the first block and the second block apart; and an eccentric member for urging the first block toward the second block against the biasing action of the biasing facility and with the end of the object located between the first block and the second block.

24. A device for measuring the curvature of an object having a dimensional character which includes spaced portions of the object, one of which represents an end thereof, and an axis extending between the spaced portions of the object to define a length thereof, which comprises:

mounting structure for supporting the object in a curved state;

a locating member mounted for incremental movement along the length of the object;

a sensing unit attached to the locating member for movement therewith for sensing the precise location of the locating member along the axis of the object relative to the sensing of other locations along the axis of the object;

the sensing unit produces data representative of each precise location sensed;

a processor for arranging the data in a format representative of the curvature of the object;

a holding mechanism for engagement with and holding the end of the object during movement of the locating member along the length of the object;

a guide bar; and the holding mechanism mounted on the guide bar for movement therealong to facilitate movement of the end of the object upon movement of the holding mechanism.

25. The device as set forth in claim 24, which further comprises:

securing structure for securing the holding mechanism at a selected location along the guide bar to thereby retain the held end of the object in the position to which the holding mechanism has been moved.

26. The device as set forth in claim 24, which further comprises:

a weight mountable on the holding mechanism or the end of the object to subject the holding mechanism to a moving force whereby the holding mechanism and the end of the object move a prescribed distance in accordance with the weight.

27. A device for measuring the curvature of an object having a dimensional character which includes spaced portions of the object and an axis extending between the spaced portions of the object to define a length thereof, which comprises:

mounting structure for supporting the object in a curved state;

a locating member mounted for incremental movement along the length of the object, which comprises:

a first pulley mountable for engagement with a first portion of the exterior of the object along the length thereof;

a second pulley mountable for engagement with a second portion of the exterior of the object along the length thereof where the first portion is spaced from the second portion of the object; and a biasing facility for normally urging the first pulley and the second pulley toward each other;

a sensing unit attached to the locating member for movement therewith for sensing the precise location of the locating member along the axis of the object relative to the sensing of other locations along the axis of the object;

the sensing unit produces data representative of each precise location sensed; and a processor for arranging the data in a format representative of the curvature of the object.

28. The device as set forth in claim 27 wherein the locating member further comprises:

a support member having a hole at one end thereof and an elongated slot at the other end thereof;

first, second, third and fourth linkage arms;

the first linkage arm attached by a first pin at a first end of the first arm to a first end of the second linkage arm and a second end of the first linkage arm attached by a second pin to a first end of the fourth linkage arm;

the third linkage arm attached by a third pin at a first end of the third arm to a second end of the second linkage arm and a second end of the third linkage arm attached by a fourth pin to a second end of the fourth linkage arm;

each of the linkage arms being revolvable about the respective pins located at each end thereof;

the first pulley mounted on the second pin and the second pulley mounted on the third pin;

the first pin located in the elongated slot of the support member for movement therein;

the fourth pin located in the hole of the support member; and a spring connected to and between the second pin and the third pin to normally urge the first pulley and the second pulley toward each other.

29. A device for measuring the curvature of a shaft having a dimensional character which includes spaced portions of the shaft and an axis extending between the spaced portions of the shaft to define a length thereof and wherein the shaft is tapered inwardly toward the axis thereof between the spaced portions thereof, which comprises:

mounting structure for supporting the object in a curved state;

a locating member mounted for incremental movement along the length of the object, which comprises:

a first element mounted for engagement with a first portion of the shaft along one side thereof;

a second element mounted for engagement with a second portion of the shaft along another side thereof opposite the one side; and a biasing facility for normally urging the first element and the second element toward each other;

a sensing unit attached to the locating member for movement therewith for sensing the precise location of the locating member along the axis of the object relative to the sensing of other locations along the axis of the object;

the sensing unit produces data representative of each precise location sensed; and a processor for arranging the data in a format representative of the curvature of the object.

30. A device for measuring the curvature of an object having a dimensional character which includes spaced portions of the object and an axis extending between the spaced portions of the object to define a length thereof, which comprises:

mounting structure for placing and maintaining the object in a curved state;

a sensing unit movable along the length of the object for developing data representative of incremental points along the axis of the object; and a processor responsive to the data developed by the sensing unit for processing the data into a format which represents the curvature of the object between the spaced portions thereof.

31. A method of measuring the curvature of an object having a dimensional character which includes spaced portions of the object and an axis extending between the spaced portions of the object to define a length thereof, which comprises the steps of:

placing and maintaining the object in a curved state;

sensing incremental points along the axis of the object;

developing data representative of the sensed incremental points along the axis of the object; and processing the developed data into a format representative of the curvature of the object.

32. The method as set forth in claim 31, which further comprises the step of:

supporting the object at least at one of the spaced portions thereof in preparation for and during the sensing step.

33. A method of measuring the curvature of an object having a dimensional character which includes spaced portions of the object and an axis extending between the spaced portions of the sensing incremental points along the axis of the object;

developing data representative of the sensed incremental points along the axis of the object;

processing the developed data into a format representative of the curvature of the object;

supporting the object at one of the spaced portions thereof; and moving the other of the spaced portions thereof a prescribed distance to create the curvature of the object prior to the sensing step.

34. A method of measuring the curvature of an object having a dimensional character which includes spaced portions of the object and an axis extending between the spaced portions of the object to define a length thereof, which comprises the steps of:

sensing incremental points along the axis of the object;

developing data representative of the sensed incremental points along the axis of the object;

processing the developed data into a format representative of the curvature of the object;

supporting the object at one of the spaced portions thereof; and subjecting the other of the spaced portions to a prescribed force to create the curvature of the object prior to the sensing step.

35. The method as set forth in claim 31 wherein the data is developed in the form of voltage levels, which further comprises the step of:

converting the voltage levels to digital signals.

36. The method as set forth in claim 31, which further comprises the step of:

calibrating the data to indicate the incremental points along the length of the object in a selected measurement unit.

37. The method as set forth in claim 31, which further comprises the step of:

selecting less than all of the data developed to represent the curvature of the object.

38. The method as set forth in claim 31, which further comprises the step of:

processing the data into a graphics format to develop control signals.

39. The method as set forth in claim 38, which further comprises the step of:

displaying the data in the form of the curvature of the object in response to the developed control signals.

40. A device for measuring the curvature of an axis of an object having surfaces on opposite sides thereof which extend laterally of the axis by an equal distance in any given transaxial plane along the axis, which comprises:

mounting structure for supporting the object in a curved state;

a locating member mounted for incremental movement along the length, and for engaging the surfaces on the opposite sides, of the object;

a sensing unit attached to the locating member for movement therewith for sensing the precise location of the locating member along the axis of the object relative to the sensing of other locations along the axis of the object independently of any topography of the surfaces on opposite sides of the object;

the sensing unit produces data representative of each precise location sensed; and a processor for arranging the data in a format representative of the curvature of the axis of the object.

41. A device for measuring the curvature of an axis of a curved object having surfaces on opposite sides thereof which extend laterally of the axis by an equal distance in any given transaxial plane along the axis, which comprises:

a sensing unit movable along the length and surfaces of the object for developing data representative of incremental points along the axis of the object; and a processor responsive to the data developed by the sensing unit for processing the data into a format which represents the curvature of the axis of the object between the spaced portions thereof.

42. A method of measuring the curvature of an axis of an object having surfaces on opposite sides thereof which extend laterally of the axis by an equal distance in any given transaxial plane along the axis, which comprises the steps of:

sensing incremental points along the axis of the object;

developing data representative of the sensed incremental points along the axis of the object; and processing the developed data into a format representative of the curvature of the axis.

43. The device as set forth in claim 40, wherein the object is uniformly tapered between two spaced points along an exterior thereof and the curvature of the axis is to be measured between the two spaced points.

44. The method as set forth in claim 42, wherein the object is uniformly tapered between two spaced points along an exterior thereof and the curvature of the axis is to be measured between the two spaced points.

* * * * *